United States Patent Office 3,360,502
Patented Dec. 26, 1967

3,360,502
POLYESTERAMIDEIMIDES FROM
BIS-TRIMELLITATES
Donald F. Loncrini, Schenectady, N.Y., assignor to
General Electric Company, a corporation of New
York
No Drawing. Filed Oct. 31, 1963, Ser. No. 320,516
9 Claims. (Cl. 260—78)

This invention relates to new and useful resinous compositions. More particularly, it relates to polyesteramideimides and to copolymers of this type which are useful as films, fibers, enamels, varnishes, adhesives, and the like, and which are particularly characterized by good physical qualities including high temperature resistance.

Since equipment, such as electrical apparatus and the like, is designed to operate at continually higher and higher temperatures, there is created the requirement that resinous materials which are associated therewith such as films, fibers, enamels, varnishes, adhesives, etc., must, in turn, be resistant to such elevated temperatures.

A principal object, therefore, of this invention is to provide unique polyesteramideimide materials which are particularly suited for use at elevated temperatures.

The polymers of the present invention are prepared by reacting substantially equimolar amounts of dibasic acid dihydrazides with peculiar polyanhydrides to produce high molecular weight linear polymers which, upon heating, are converted to polyesteramideimides having desirable characteristics. Encompassed within the scope of the invention are copolymers prepared by using mixtures of dibasic dihydrazides and copolymers which can be prepared by reacting mixtures of dibasic acid dihydrazides and diamines. Also included are materials which contain varying proportions of anhydride and dihydrazide to provide products of different characteristics.

Those features of the invention which are believed to be novel are set forth with particularity in the claims appended hereto. The invention will, however, be better understood and further advantages and objects thereof appreciated from a consideration of the following description.

The polyanhydrides or dianhydrides which are useful in connection with the present invention can be expressed by the formula

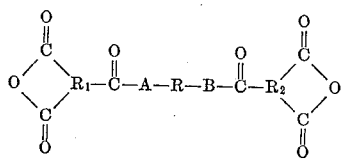

in which A can be oxygen, NH, sulfur, and the like; B can be the same as A or different within the above definition; R can be di-, tri- or polyfunctional aromatic, alicyclic, saturated or unsaturated aliphatic or a heterocyclic radical which can be either unsubstituted or substituted with other groups, such as halogen, nitro, keto, and the like. Exemplary of the aromatic radicals which can be ascribed to R are divalent aromatic radicals selected from the group having the following formulas:

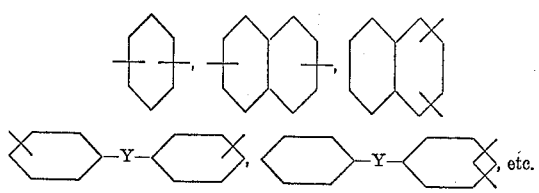

where Y represents a divalent radical selected from the group consisting of:

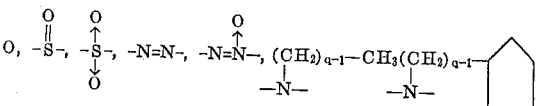

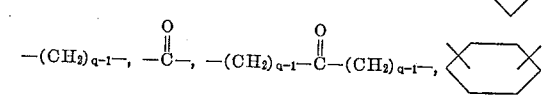

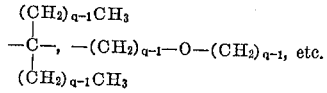

where $q$ is a positive integer of from 1 to 15. When R is a trifunctional aromatic, it can be represented by the following formula:

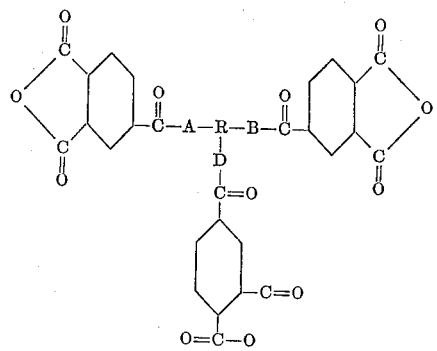

where B can be the same as A and D can be the same as A or B or these constituents can vary in any combination desired. Among the aromatic radicals which are so useful are the divalent radicals of hydroquinone; resorcinol; dihydroxy naphthalene; dihydroxy-biphenyl; 2,2-bis(4-hydroxyphenyl) propane; dihydroxybenzophenone; methyl hydroquinone; chlorohydroquinone; phloroglucinol; trihydroxy naphthalene; p-hydroxy aniline; diamino benzene; p-hydroxythiophenol, etc. In the alicyclic series R can be the divalent radical derived from cyclohexane; cyclobutane, cyclopentane, and the like. In the aliphatic series R can be

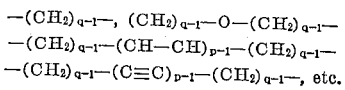

where $q$ is a positive integer from 1 to 15 and $p$ is a positive integer from 1 to 5, and is typified by the residue of ethylene glycol, diethylene glycol, polyethylene glycol, neopentyl glycol, 2,2-dibromo methyl-1,3-dihydroxy propane, 1,6-dihydroxyhexane, ethylene diamine, ethanol amine, glycerol, sugars, and the like. In the heterocyclic series, R can be the di-, tri- or polyvalent residue radicals of dihydroxy pyridine dihydroxy thiophene, dihydroxy carbazole, diamino pyridine, etc. R can be a di- or polyvalent metal such as Fe, Cu, Zn, Al, alkaline earth, etc., organometallic

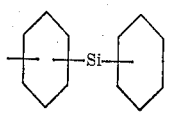

etc. $R_1$ and $R_2$ can be di-, tri- or polyfunctional aromatic radicals such as phenyl, naphthyl, phenanthryl, etc., or aliphatic radicals, such as propyl, butyl, pentyl, hexyl, octyl, decyl, etc., two of the carboxy groups being adjacent to form the anhydride.

Generally speaking, the anhydrides of the present invention can be readily prepared in quantitative yields by an acidolysis reaction between one mol of tricarboxy acid or anhydride per equivalent of a compound containing a plurality of ester or amido groups or mixtures of such groups, preferably less than about six of such groups per molecule. This acidolysis reaction takes place conveniently at from 125° C. to 325° C. and is unique in the sense that the reaction takes place on the No. 4 carboxylic acid position, thus leaving the 1 and 2 positions intact. For example, in the case of trimellitic anhydride, only the free carboxylic acid group reacts leaving intact the anhydride linkage. If trimellitic acid is used, then the 1,2-dicarboxylic acid groups form the anhydride by splitting out one molecule of water before the transesterification reaction proceeds. In either case, the reaction products are the same. Among the other tribasic materials which can be used besides trimellitic anhydride or its acid are 1,2,4-naphthalene tricarboxylic acid, 1,4,8-naphthalene tricarboxylic acid, 1,2,4-butane tricarboxylic acid, 1,2,3-benzene tricarboxylic acid, 1,2,3-propane tricarboxylic acid, and 2,3,6-naphthalene tricarboxylic acids or their corresponding anhydrides, among others. In preparing the anhydrides, equivalent parts of a suitable ester or amide are reacted with one mol of trimellitic anhydride, for example, or other tribasic material as described above either in the presence or absence of solvents and with or without catalysts of the transesterification type. Among the solvents which are useful in connection with the present invention are the chlorinated aromatic materials such as chlorinated diphenyls, diphenyl ether, etc. Among the transesterification catalysts which are well known to those skilled in the art are MgO, Mg, $Li_2CO_3$, $H_2SO_4$, $HgSO_4$, etc. Generally, reaction takes place in a temperature range of from about 125° C. to 300° C. and is complete when the theoretical amount of lower boiling acid has been removed by distillation. Normally, this takes place between 30 and 100 minutes. In general, any acid derivative of a hydroxy, amino, mercapto, etc., compound can be used in the transesterification reaction such as formate acetate, propionate, butyrate, benzoate, and the like. The corresponding amides can also be used. However, from the point of view of convenience and economy of raw materials the acetates are preferred. It will be realized, of course, that when the ester or amide, for example, is of such low boiling point that reaction does not take place, other suitable derivatives should be used.

The dibasic acid dihydrazides which are useful in conjunction with the present invention can be expressed by the formula

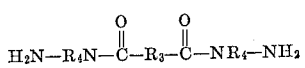

where $R_3$ is an aliphatic, aromatic, alicyclic or heterocyclic radical and $R_4$ is H, or an aliphatic, aromatic or alicyclic radical. The dihydrazide may also be expressed by the formula

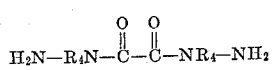

where $R_4$ has the same meaning as above and $R_3$ is absent.

In preparing the present compositions, the polyanhydride and the dihydrazide are reacted in substantially equimolar proportions to form a high molecular weight linear polymer, the molecular weight of which can be controlled by using an excess of either one of the reactants or by using a small amount of a monofunctional reactant in addition to the dianhydride and the other reactant such as a monoacid anhydride, a monoacid hydrazide or a monoamine. The reaction takes place at room temperature preferably in the presence of any convenient solvent which does not react with the reactants and which will dissolve the polymer produced. Among such solvents are cresols, such as metacresol, dimethylformamide, dimethylacetamide, dimethylsulfoxide, and N-methylpyrrolidone. The anhydride and the hydrazide can be added to the solvent or the solvent may be added in one portion to a mixture of the solid coreactants. Alternatively, one of the reactants can be dissolved or dispersed in the solvent previous to the addition of the other reactant. The mixture is stirred at room temperature under an inert atmosphere such as nitrogen, and the like, for periods ranging from about 15 minutes to 4 hours. The reaction proceeds readily and is apparent from a gradual increase in the viscosity of the solution.

The dianhydride and dihydrazide react as above to provide an intermediate high molecular weight linear polymer of the formula

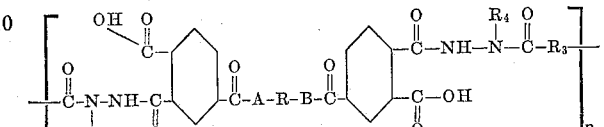

where the various R's, A and B are the same as above and $n$ is a number more than 1. When the above linear polymer is heated to a temperature range from about 200° to 300° C. for a period of from 15 to 60 minutes, it is converted to a polyesteramideimide which can be expressed by the formula

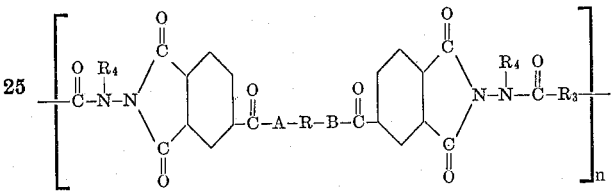

where the various R's, A and B are the same as above and $n$ is again a number more than 1.

The following examples will illustrate the practice of the present invention, it being realized that they are to be taken as exemplary thereof and not limiting in any way. All parts are by weight.

*Example 1*

There were added to a mixture of 4.58 grams (0.01 mol) of p-phenylene-bis-(trimellitate)dianhydride and 1.94 grams (0.01 mol) of isophthalyl dihydrazide, 60 cc. of dimethylformamide. The mixture was stirred vigorously under a nitrogen atmosphere with external cooling for one hour. The viscous polymer solution resulting had an inherent viscosity of 1.18 as measured in a 0.5% solution in dimethylformamide. A film of this polyesteramideimide cast from solution was heated at 200° C. for 15 minutes to yield a tough, flexible film which was insoluble in dimethylformamide. The melting point of the polyesteramideimide film so prepared was found to be greater than 500° C.

*Example 2*

To a mixture of 9.70 grams (0.05 mol) of isophthalyl dihydrazide, 5.4 grams (0.05 mol) p-phenylene diamine and 45.8 grams (0.10 mol) of p-phenylene-bis-(trimellitate)dianhydride, there were added 600 cc. of dimethylformamide. The resulting mixture was stirred vigorously with external cooling under a blanket of nitrogen for two hours. The resultant copolymer solution had an inherent viscosity of 1.73 as measured in a 0.5% solution in dimethylformamide. A film cast from the solution after heating at 200° C. for 30 minutes produced a tough and flexible polyesteramideimide copolymer which had a melting point of over 500° C.

*Example 3*

To a mixture of 4.58 grams (0.01 mol) of p-phenylene-bis-(trimellitate)dianhydride, 0.54 gram (0.005 mol) of metaphenylene diamine and 0.59 gram (0.005 mol) of oxalyl dihydrazide, there were added 60 cc. of dimethylformamide, the resulting mixture being stirred for two hours in an atmosphere of nitrogen. The resultant viscous polymer had an inherent viscosity of 1.05 as measured in a 0.5% solution of dimethylformamide. When a film was cast from the solution and heated to 200° C. for thirty minutes, a tough, flexible polyesteramideimide copolymer resulted which had a melting range of from about 370° C. to 380° C.

Example 4

To a mixture of 0.57 gram (0.005 mol) of isophthalyl dihydrazide, 0.59 gram (0.005 mol) of oxalyl dihydrazide and 4.58 grams (0.01 mol) of p-phenylene-bis-(trimellitate) dianhydride, there were added 60 cc. of dimethylformamide. The resulting mixture was stirred under a nitrogen atmosphere for about two hours to produce a viscous polymer solution having an inherent viscosity of 1.59 as measured in a 0.5% solution of dimethylformamide. When a film was cast from the solution and heated to a temperature of 200° C. for thirty minutes, the resulting polyesteramideimide copolymer film was tough and flexible and had a melting point of over 300° C.

Example 5

To a mixture of 4.58 grams (0.01 mol) of p-phenylene-bis-(trimellitate) dianhydride and 1.18 grams (0.01 mol) of oxalyl dihydrazide, there were added 60 cc. of dimethylformamide which was reacted as in Example 4 above. The resultant polymer solution had an inherent viscosity of 1.80 as measured in a 0.5% solution of dimethylformamide. When a film cast from the solution was heated to a temperature of 200° C. for thirty minutes, the resultant polyesteramideimide film was tough and flexible and had a melting point of over 400° C.

Example 6

A mixture of 2.3 grams (0.01 mol) of sebacic acid dihydrazide and 4.58 grams (0.01 mol) of p-phenylene-bis-(trimellitate) dianhydride in 60 cc. of metacresol was reacted as in Example 4 above to produce a viscous polymer solution having an inherent viscosity greater than 0.4 as measured in a 0.5% solution in dimethylformamide. When a film cast from the solution was heated to 200° C. for thirty minutes, the polyesteramideimide film resulting was tough and flexible and had a melting point greater than 350° C.

Example 7

To a mixture of 0.54 gram (0.005 mol) of paraphenylene diamine, 1.15 grams (0.005 mol) of sebacic acid dihydrazide and 4.58 grams (0.01 mol) of p-phenylene-bis-(trimellitate) dianhydride, there were added 60 cc. of N-methylpyrrolidone. The resulting mixture was reacted as in Example 4 above to produce a polymer solution having an inherent viscosity of 1.05 as measured in a 0.5% solution in dimethylformamide. When a film cast from the solution was heated to a temperature of 250° C. for thirty minutes, the film was tough and flexible and heated to a melting point of over 500° C. When applied to electrical conductors the present materials provide insulation which is characterized by excellent electrical qualities as well as resistance to elevated temperatures. The present materials can be prepared in many desirable forms including, besides films, varnishes, wire enamels, adhesives and the like which can be employed as is or filled with well known fillers to provide tailored physical characteristics depending upon the filler used.

What I claim as new and desire to secure by Letters Patent of the United States is:

1. A polyesteramideimide consisting essentially of the recurring unit

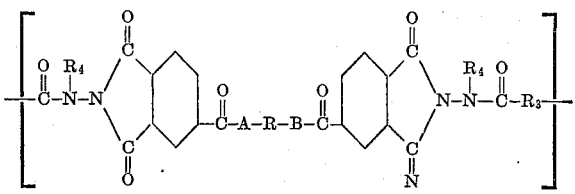

where A is selected from the group consisting of oxygen, NH and sulfur, B is selected from the group consisting of oxygen, NH and sulfur, R is a divalent organic radical containing at least two carbon atoms, $R_1$ and $R_2$ are selected from the group consisting of trivalent aromatic, carbocyclic and saturated aliphatic groups, $R_3$ is selected from aliphatic, aromatic, alicyclic and heterocyclic radicals and $R_4$ is selected from hydrogen, aliphatic, aromatic and alicyclic radicals.

2. An electrical conductor coated with a polyesteramideimide consisting essentially of the recurring unit

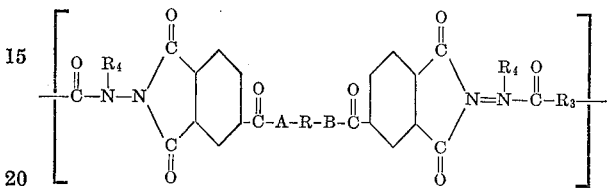

where A is selected from the group consisting of oxygen, NH and sulfur, B is selected from the group consisting of oxygen, NH and sulfur, R is a divalent organic radical containing at least two carbon atoms, $R_1$ and $R_2$ are selected from the group consisting of trivalent aromatic, carbocyclic and saturated aliphatic groups, $R_3$ is selected from aliphatic, aromatic, alicyclic and heterocyclic radicals and $R_4$ is selected from hydrogen, aliphatic, aromatic and alicyclic radicals.

3. The solid dimethyl formamide insoluble polyesteramideimide of p-phenylene-bis-(trimellitate) anhydride and isophthalyl dihydrazide.

4. The solid dimethyl formamide insoluble polyesteramideimide of isophthalyl dihydrazide, p-phenylene diamine and p-phenylene-bis-(trimellitate) anhydride, said anhydride and combined dihydrazide and diamine being in essentially equimolar parts.

5. The solid dimethyl formamide insoluble polyesteramideimide of p-phenylene-bis-(trimellitate) dianhydride, metaphenylene diamine and oxalyl dihydrazide, said dianhydride and combined diamine and dihydrazide being in essentially equimolar parts.

6. The solid dimethyl formamide insoluble polyesteramideimide of isophthalyl dihydrazide, oxalyl dihydrazide and p-phenylene-bis-(trimellitate) dianhydride, said dianhydride and combined dihydrazide being in essentially equimolar parts.

7. The solid dimethyl formamide insoluble polyesteramideimide of p-phenylene-bis-(trimellitate) dianhydride and oxalyl dihydrazide.

8. The solid dimethyl formamide insoluble polyesteramideimide of sebacic acid dihydrazide and p-phenylene-bis-(trimellitate) dianhydride.

9. The solid dimethyl formamide insoluble polyesteramideimide of para-phenylene diamine, sebacic acid dihydrazide and p-phenylene-bis-(trimellitate) dianhydride, said dianhydride and combined diamine and dihydrazide being in essentially equimolar parts.

References Cited

UNITED STATES PATENTS

| | | | |
|---|---|---|---|
| 3,130,182 | 4/1964 | Frazer | 260—78 |
| 3,130,183 | 4/1964 | Frazer | 260—78 |
| 3,174,947 | 3/1965 | Marvel et al. | 260—78.4 |
| 3,238,183 | 3/1966 | Frazer | 260—78 |

WILLIAM H. SHORT, *Primary Examiner.*

SAMUEL H. BLECH, *Examiner.*

H. D. ANDERSON, *Assistant Examiner.*

UNITED STATES PATENT OFFICE
CERTIFICATE OF CORRECTION

Patent No. 3,360,502                              December 26, 1967

Donald F. Loncrini

It is hereby certified that error appears in the above numbered patent requiring correction and that the said Letters Patent should read as corrected below.

Column 6, lines 13 to 20, the formula should appear as shown below instead of as in the patent:

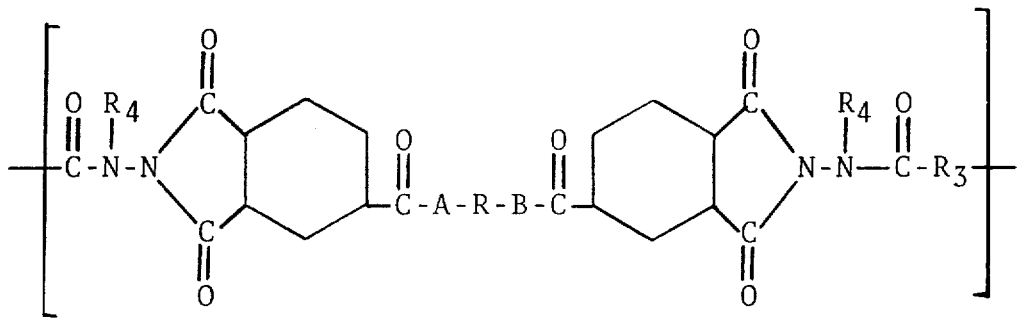

Signed and sealed this 21st day of January 1969.

(SEAL)
Attest:

EDWARD M. FLETCHER, JR.                      EDWARD J. BRENNER
Attesting Officer                              Commissioner of Patents